(12) United States Patent
Hayashi et al.

(10) Patent No.: US 11,877,577 B2
(45) Date of Patent: Jan. 23, 2024

(54) ANTIBACTERIAL COMPOSITION, ANTIBACTERIAL FILM, AND ANTIBACTERIAL FILM-ATTACHED SUBSTRATE

(71) Applicant: FUJIFILM Corporation, Tokyo (JP)

(72) Inventors: Takahiro Hayashi, Shizuoka (JP); Yoshihito Hodosawa, Shizuoka (JP); Tomonari Ogawa, Shizuoka (JP); Takahiro Nakazawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 17/017,696

(22) Filed: Sep. 11, 2020

(65) Prior Publication Data

US 2020/0404925 A1    Dec. 31, 2020

Related U.S. Application Data

(63) Continuation of application No. PCT/JP2019/010594, filed on Mar. 14, 2019.

(30) Foreign Application Priority Data

Mar. 29, 2018 (JP) ................ 2018-063979

(51) Int. Cl.
| | |
|---|---|
| A01N 59/16 | (2006.01) |
| A01N 25/10 | (2006.01) |
| A01N 59/26 | (2006.01) |
| A01N 25/34 | (2006.01) |
| C08F 222/10 | (2006.01) |

(52) U.S. Cl.
CPC ............. *A01N 59/16* (2013.01); *A01N 25/10* (2013.01); *A01N 25/34* (2013.01); *A01N 59/26* (2013.01); *C08F 222/103* (2020.02)

(58) Field of Classification Search
CPC ..................... C08F 222/103; C08F 2003/0806
See application file for complete search history.

(56) References Cited

U.S. PATENT DOCUMENTS

| | | | | |
|---|---|---|---|---|
| 6,162,533 | A * | 12/2000 | Onozawa | A01N 59/16 |
| | | | | 428/323 |
| 8,097,263 | B2 | 1/2012 | Sugiura et al. | |
| 10,254,648 | B2 | 4/2019 | Shindo | |
| 2007/0238807 | A1* | 10/2007 | Safir | A61K 9/0014 |
| | | | | 523/113 |
| 2010/0221360 | A1 | 9/2010 | Sugiura et al. | |
| 2016/0030616 | A1* | 2/2016 | Nariyuki | A01N 25/34 |
| | | | | 600/22 |
| 2017/0013842 | A1 | 1/2017 | Nagasaki et al. | |
| 2017/0066929 | A1 | 3/2017 | Nariyuki et al. | |
| 2018/0015691 | A1 | 1/2018 | Nagasaki et al. | |
| 2019/0110478 | A1 | 4/2019 | Isobe et al. | |
| 2020/0298529 | A1 | 9/2020 | Nagasaki et al. | |

FOREIGN PATENT DOCUMENTS

| | | |
|---|---|---|
| CN | 101392065 | 3/2009 |
| CN | 101883489 | 11/2010 |
| CN | 106163802 | 11/2016 |
| CN | 106413557 | 2/2017 |
| JP | H08311373 | 11/1996 |
| JP | H1157603 | 3/1999 |
| JP | 2003160623 | 6/2003 |
| JP | 2004168949 | 6/2004 |
| JP | 2009255567 | 11/2009 |
| JP | 2012158116 | 8/2012 |
| JP | 2021017513 | 2/2021 |
| WO | 2009044478 | 4/2009 |
| WO | 2015029930 | 3/2015 |
| WO | 2015147201 | 10/2015 |
| WO | 2015147206 | 10/2015 |
| WO | 2015178166 | 11/2015 |
| WO | 2016158104 | 10/2016 |
| WO | 2018016207 | 1/2018 |
| WO | 2019013227 | 1/2019 |

OTHER PUBLICATIONS

Sigma Aldrich: 2-hydroxyethyl methacrylate, 1 pgs.*
Sigma Aldrich: 2-ethylhexyl methacrylate, 1 pgs.*
Yamamoto, Noriyuki et al., Features and applications of silver inorganic antimicrobial agent "NOVARON", with English concise explanation of relevance, Toa Gosei Annual Research Report, 1998, pp. 1-9.
Office Action of Japan Counterpart Application, with English translation thereof, dated Aug. 25, 2020, pp. 1-6.
"International Search Report (Form PCT/ISA/210) of PCT/JP2019/010594," dated Jun. 4, 2019, with English translation thereof, pp. 1-4.
"Written Opinion of the International Searching Authority (Form PCT/ISA/237) of PCT/JP2019/010594," dated Jun. 4, 2019, with English translation thereof, pp. 1-11.
Office Action of China Counterpart Application, with English translation thereof, dated Mar. 23, 2021, pp. 1-14.

(Continued)

*Primary Examiner* — Kyle A Purdy
(74) *Attorney, Agent, or Firm* — JCIPRNET

(57) ABSTRACT

The present invention provides an antibacterial composition capable of forming an antibacterial film having suppressed coloration, excellent antibacterial property, and suppressed film cracking, antibacterial film, and an antibacterial film-attached substrate. The antibacterial composition of the present invention includes a silver-based antibacterial agent containing zirconium phosphate and silver carried and supported on the zirconium phosphate, a monomer having a polymerizable group, and a solvent. The monomer having a polymerizable group includes a first monomer having a polymerizable group and a hydrophilic group, and a second monomer having a polymerizable group and having no hydrophilic group, and the content of the first monomer is 30% to 70% by mass with respect to the total mass of the monomer having a polymerizable group.

21 Claims, No Drawings

(56) References Cited

OTHER PUBLICATIONS

Hiroki Kourai, "Current Situation and Future of Inorganic Antimicrobial Agents", Inorganic Material, Nov. 1999, with partial English translation, pp. 1-11.

Hiyama Keiichiro, "The Antimicrobial Treatment of Plastics Products", The Consumption Science of Textiles, Sep. 1999, with partial English translation, pp. 1-10.

"Office Action of Japan Counterpart Application", dated Jan. 5, 2021, with English translation thereof, pp. 1-6.

"Office Action of China Counterpart Application" with English translation thereof, dated Nov. 3, 2021, p. 1-p. 10.

"Office Action of China Counterpart Application" with English translation thereof, dated Jan. 17, 2022, p. 1-p. 20.

"Notice of Reasons for Refusal of Japan Counterpart Application", dated Sep. 6, 2022, with English translation thereof, p. 1-p. 11.

\* cited by examiner

ANTIBACTERIAL COMPOSITION, ANTIBACTERIAL FILM, AND ANTIBACTERIAL FILM-ATTACHED SUBSTRATE

CROSS-REFERENCE TO RELATED APPLICATIONS

This application is a Continuation of PCT International Application No. PCT/JP2019/010594 filed on Mar. 14, 2019, which claims priority under 35 U.S.C. § 119(a) to Japanese Patent Application No. 2018-063979 filed on Mar. 29, 2018. The above application is hereby expressly incorporated by reference, in its entirety, into the present application.

BACKGROUND OF THE INVENTION

1. Field of the Invention

The present invention relates to an antibacterial composition, an antibacterial film, and an antibacterial film-attached substrate.

2. Description of the Related Art

As technology for preventing an article such as a touch panel from being contaminated by bacteria and the like, attention has been paid to a technology of providing an antibacterial film on the surface of the article.

WO2015/178166A discloses a device including a hydrophilic processed portion (antibacterial film) including an antibacterial agent containing a hydrophilic polymer and silver. In a case of manufacturing the above-described antibacterial film, a composition for forming an antibacterial coating film (an antibacterial composition), containing predetermined components, is used.

SUMMARY OF THE INVENTION

The inventors of the present invention examined the antibacterial composition disclosed in WO2015/178166A and have found that the composition is colored with the passage of time. In a case where an antibacterial film is formed on each article by using such a colored antibacterial composition, the appearance of the obtained article is impaired since the antibacterial film itself is colored.

In addition, from the viewpoint of the appearance of the obtained article, it is required that an antibacterial film has no film cracking.

In consideration of the above circumstances, an object of the present invention is to provide an antibacterial composition capable of forming an antibacterial film having suppressed coloration, excellent antibacterial property, and suppressed film cracking.

In addition, another object of the present invention is to provide an antibacterial film and an antibacterial film-attached substrate.

As a result of intensive studies to solve the above-described problems, the inventors of the present invention have found that the above-described problems can be solved by an antibacterial composition having a specific composition and have completed the present invention.

That is, the inventors of the present invention have found that the above-described problems can be solved by the following configurations.

(1) An antibacterial composition comprising:
a silver-based antibacterial agent containing zirconium phosphate and silver carried and supported on the zirconium phosphate;
a monomer having a polymerizable group; and
a solvent,
in which the monomer having a polymerizable group includes a first monomer having a polymerizable group and a hydrophilic group, and a second monomer having a polymerizable group and having no hydrophilic group, and
a content of the first monomer is 30% to 70% by mass with respect to a total mass of the monomer having a polymerizable group.

(2) The antibacterial composition according to (1), in which a content of the first monomer is 30% to 60% by mass with respect to the total mass of the monomer having a polymerizable group.

(3) The antibacterial composition according to (1) or (2), in which a molecular weight of the first monomer is lower than a molecular weight of the second monomer.

(4) The antibacterial composition according to any one of (1) to (3), in which the first monomer is an acrylate monomer having two or more polymerizable groups and a hydrophilic group, or a methacrylate monomer having two or more polymerizable groups and a hydrophilic group, and
the second monomer is an acrylate monomer having two or more polymerizable groups and having no hydrophilic group, or a methacrylate monomer having two or more polymerizable groups and having no hydrophilic group.

(5) The antibacterial composition according to any one of (1) to (4), in which the solvent contains an alcohol, and
a content of the alcohol is 40% by mass or more and less than 100% by mass with respect to a total mass of the solvent.

(6) An antibacterial film formed by using the antibacterial composition according to any one of (1) to (5).

(7) The antibacterial film according to (6), in which the antibacterial film has a thickness of 2 to 20 μm.

(8) An antibacterial film-attached substrate comprising:
a substrate; and
the antibacterial film according to (6) or (7), disposed on the substrate.

According to the present invention, an antibacterial composition capable of forming an antibacterial film having suppressed coloration, excellent antibacterial property, and suppressed film cracking can be provided.

In addition, according to the present invention, and antibacterial film and an antibacterial film-attached substrate can be provided.

DESCRIPTION OF THE PREFERRED EMBODIMENTS

In the following description, the present invention will be described in more detail.

According to the present specification, a value range described using the symbol "~" means a range including the numerical values described before and after the symbol "~" as the lower limit and the upper limit.

The main feature of the antibacterial composition of the present invention is that a silver-based antibacterial agent containing zirconium phosphate and silver carried and supported on zirconium phosphate is used, and the amount to be used of the first monomer having a hydrophilic group is adjusted.

As a result of intensive studies to solve the problems in the related art, the inventors of the present invention have found that in the conventional antibacterial composition, metallic silver or silver ions are gradually eluted from the antibacterial agent containing silver, and as a result, the coloration of the antibacterial composition occurs. On the other hand, as described above, the inventors of the present invention have found that the above-described problem of coloration can be solved while maintaining the antibacterial property of an antibacterial film and suppressing the occurrence of film cracking, by changing the kind of silver-based antibacterial agent and adjusting the amount to be used of the first monomer having a hydrophilic group.

Hereinafter, each component included in the antibacterial composition will be first described in detail.

<Silver-Based Antibacterial Agent>

The antibacterial composition includes a silver-based antibacterial agent (hereinafter, also simply referred to as "a specific silver-based antibacterial agent") containing zirconium phosphate and silver carried and supported on the zirconium phosphate.

The form of silver carried and supported on zirconium phosphate is not particularly limited, and examples thereof include metallic silver and a silver ion.

The average particle size of the specific silver-based antibacterial agent is not particularly limited; however, the average particle size thereof is preferably 0.1 to 10 μm and more preferably 0.1 to 2 μm.

The aforementioned average particle size is a value obtained by observing a specific silver-based antibacterial agent using an optical microscope, measuring the diameters of at least random ten particles (primary particles) of the specific silver-based antibacterial agent, and calculating an arithmetic average of those diameters. In a case where the particle is not perfectly circular, the major axis is used and the arithmetic average is calculated.

The content of silver in the specific silver-based antibacterial agent is not particularly limited; however, the content of silver is preferably 0.1% to 10% by mass and more preferably 0.3% to 5% by mass, with respect to the total mass of the specific silver-based antibacterial agent.

The content of the specific silver-based antibacterial agent in the antibacterial composition is not particularly limited; however, the content of the specific silver-based antibacterial agent is preferably 0.01% to 20% by mass, more preferably 0.1% to 10% by mass, and still more preferably 0.5% to 10% by mass, with respect to the total solid content of the antibacterial composition.

Here, the solid content means the component that constitutes the antibacterial film and does not include a solvent. Even in a case where a component constituting the antibacterial film is liquid, the component is included in the above calculation as the solid content.

In addition, the content of the specific silver-based antibacterial agent is preferably 0.005% to 10% by mass, more preferably 0.05% to 5% by mass, and still more preferably 0.25% to 5% by mass, with respect to the total mass of the antibacterial composition.

Further, the content of silver in the antibacterial composition is not particularly limited; however, the content of silver is preferably 0.001% to 20% by mass and more preferably 0.001% to 5% by mass, with respect to the total mass of the antibacterial composition.

<Monomer Having Polymerizable Group>

The antibacterial composition includes a monomer having a polymerizable group.

The monomer having a polymerizable group includes a first monomer having a polymerizable group and a hydrophilic group, and a second monomer having a polymerizable group and having no hydrophilic group.

(First Monomer)

The first monomer has a polymerizable group and a hydrophilic group.

The kind of polymerizable group is not particularly limited, and examples thereof include a radical polymerizable group, a cationic polymerizable group, and an anionic polymerizable group. Examples of the radical polymerizable group include an acryloyloxy group, a methacryloyloxy group, an acrylamide group, a methacrylamide group, a vinyl group, a styryl group, and an allyl group. Examples of the cationic polymerizable group include a vinyl ether group, an oxiranyl group, and an oxetanyl group. Among them, an acryloyloxy group or a methacryloyloxy group is preferable.

The kind of hydrophilic group is not particularly limited, and examples include a hydroxy group, a polyoxyalkylene group (for example, a polyoxyethylene group, a polyoxypropylene group, or a polyoxyalkylene group in which oxyethylene groups and oxypropylene groups are bonded in a block-like fashion or a random fashion), an amino group, a carboxyl group, an alkali metal salt of a carboxyl group, an alkoxy group, an amide group, a carbamoyl group, a sulfonamide group, a sulfamoyl group, a sulfonic acid group, and an alkali metal salt of a sulfonic acid group.

The number of polymerizable groups in the first monomer is not particularly limited; however, the number of polymerizable groups is preferably 2 or more, more preferably 2 to 6, and still more preferably 2 to 5.

The number of hydrophilic groups in the first monomer is not particularly limited; however, the number of hydrophilic groups is preferably 1 or more, more preferably 1 to 6, and still more preferably 1 to 5.

The first monomer is preferably an acrylate monomer having two or more polymerizable groups and a hydrophilic group, or a methacrylate monomer having two or more polymerizable groups and a hydrophilic group, in the fact that at least one effect (hereinafter, simply referred to as "the effect of the present invention being more excellent") of the coloring of the antibacterial composition being further suppressed, the antibacterial property of the antibacterial film being more excellent, or the film cracking of the antibacterial film being less likely to occur can be obtained.

The acrylate monomer is a monomer having an acryloyloxy group, and the methacrylate monomer is a monomer having a methacryloyl group.

As the first monomer, the compound represented Formula (1) is preferable since the effect of the present invention is more excellent.

$$(X-L^1)_n\text{-}Z\text{-}(L^2\text{-}Y)_m \qquad \text{Formula (1)}$$

In Formula (1), X represents a hydrophilic group. The definition of the hydrophilic group is as described above.

$L^1$ represents a single bond or a divalent linking group. The kind of the divalent linking group is not particularly limited, and examples thereof include —O—, —CO—, —NH—, an alkylene group, an arylene group, a heteroarylene group, and a combination thereof (for example, —O-alkylene group- and -alkylene group-O-alkylene group-).

Y represents a polymerizable group. The definition of the polymerizable group is as described above.

$L^2$ represents a single bond or a divalent linking group. Examples of the divalent linking group include the groups exemplified in $L^1$ above.

Z represents a carbon atom or a group represented by Formula (A).

In Formula (A), $L^3$ represents a divalent linking group. Examples of the divalent linking group include the groups exemplified in $L^1$ above. * represents a bonding position.

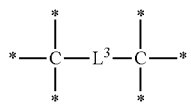

Formula (A)

In a case where Z is a carbon atom, n represents an integer of 1 to 3 (preferably an integer of 1 to 2), m represents an integer of 1 to 3 (preferably an integer of 2 to 3), and n and m satisfy a relationship of n+m=4. In a case where Z is a group represented by Formula (A), n represents an integer of 1 to 5 (preferably an integer of 1 to 2), m represents an integer of 1 to 5 (preferably an integer of 4 to 5), and n and m satisfy a relationship of n+m=6.

Examples of the first monomer include pentaerythritol triacrylate and an ethoxylated glycerin triacrylate.

(Second Monomer)

The second monomer has a polymerizable group and has no hydrophilic group.

The definitions of the polymerizable group and the hydrophilic group are as described above.

The number of polymerizable groups in the first monomer is not particularly limited; however, the number of polymerizable groups is preferably 2 or more and more preferably 2 to 6.

The second monomer is preferably an acrylate monomer having two or more polymerizable groups and having no hydrophilic group, or a methacrylate monomer having two or more polymerizable groups and having no hydrophilic group since the effect of the present invention is more excellent.

As the second monomer, the compound represented Formula (2) is preferable since the effect of the present invention is more excellent.

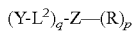

Formula (2)

Formula (2), the definitions of Z, $L^2$, and Y are as described above.

R represents a hydrogen atom or an alkyl group. The number of carbon atoms in the alkyl group is not particularly limited, preferably 1 to 10, and more preferably 1 to 5.

In a case where Z is a carbon atom, q represents an integer of 1 to 4 (preferably an integer of 3 to 4), p represents an integer of 0 to 3 (preferably an integer of 0 to 1), and q and p satisfy a relationship of q+p=4. In a case where Z is a group represented by Formula (A), q represents an integer of 1 to 6 (preferably an integer of 5 to 6), p represents an integer of 0 to 5 (preferably an integer of 0 to 1), and q and p satisfy a relationship of q+p=6.

Examples of the second monomer include trimethylolpropane triacrylate, tetramethylolmethane tetraacrylate, dipentaerythritol hexaacrylate, and pentaerythritol tetraacrylate.

The content of the first monomer is, with respect to the total mass of the monomers having a polymerizable group, 30% to 70% by mass, preferably 30% to 60% by mass in the fact that the coloration of the antibacterial composition is further suppressed, and more preferably 50% to 60% by mass in the fact that the antibacterial property is more excellent and the film cracking of the cured film is further suppressed.

The first monomers may be used singly, or two or more kinds thereof may be used in combination. In a case where two or more kinds of first monomers are used in combination, the total content is within the range described above.

The content of the first monomer in the antibacterial composition is not particularly limited; however, the content of the first monomer is preferably 20% to 70% by mass and more preferably 25% to 60% by mass with respect to the total solid content of the antibacterial composition since the effect of the present invention is more excellent.

The content of the second monomer in the antibacterial composition is not particularly limited; however, the content of the second monomer is preferably 20% to 70% by mass and more preferably 30% to 70% by mass with respect to the total solid content of the antibacterial composition since the effect of the present invention is more excellent.

The second monomers may be used singly, or two or more kinds thereof may be used in combination. In a case where two or more kinds of second monomers are used in combination, it is preferable that the total content is in the range described above.

The content of the first monomer with respect to the total mass of the antibacterial composition is preferably 10% to 40% by mass and more preferably 10% to 30% by mass since the effect of the present invention is more excellent.

The content of the second monomer with respect to the total mass of the antibacterial composition is preferably 10% to 40% by mass and more preferably 10% to 30% by mass since the effect of the present invention is more excellent.

The molecular weight of the first monomer is preferably lower than the molecular weight of the second monomer since the effect of the present invention is more excellent.

<Solvent>

The antibacterial composition includes a solvent.

The examples of the solvent include water and a known organic solvent.

The solvents may be used singly, or two or more kinds thereof may be used in combination.

Examples of the organic solvent include: alcohols such as methanol, ethanol, n-propanol, isopropanol, n-butanol, and isobutanol; ketones such as acetone, methylisobutyl ketone, methylethyl ketone, and cyclohexanone; cellosolves such as ethyl cellosolve; aromatic hydrocarbons such as toluene and xylene; glycol ethers such as propylene glycol monomethyl ether and propylene glycol methyl ether acetate; and acetic acid esters such as methyl acetate, ethyl acetate, and butyl acetate.

Among them, the antibacterial composition preferably includes an alcohol and more preferably isopropanol in the fact that the coloration is further suppressed.

The content of the alcohol is, with respect to the total mass of the solvent, preferably 40% by mass or more and less than 100% by mass, and more preferably 60% by mass or more and less than 100% by mass, in the fact that the coloration is further suppressed.

The concentration of the solid content of the antibacterial composition is not particularly limited; however, in the fact that the antibacterial composition has superior coating performance, the solid content is preferably 5% to 80% by mass, and more preferably 20% to 60% by mass.

<Other Components>

The antibacterial composition may include other components to the extent that the effects of the invention are provided. Examples of the other components include a polymerization initiator and a dispersant.

(Polymerization Initiator)

It is preferable that the antibacterial composition includes a polymerization initiator. In a case where the antibacterial composition includes the polymerization initiator, the obtainable antibacterial film has superior mechanical strength.

The polymerization initiator is not particularly limited, and any known polymerization initiator can be mentioned.

Examples of the polymerization initiator include a thermal polymerization initiator and a photopolymerization initiator.

Examples of the polymerization initiator include: aromatic ketones such as benzophenone and phenylphosphine oxide; α-hydroxyalkylphenone-based compounds (manufactured by BASF SE, IRGACURE 184, 127, and 2959, DAROCUR 1173, and the like); and phenylphosphine oxide-based compounds (monoacylphosphine oxide: IRGACURE TPO manufactured by BASF SE and bisacylphosphine oxide: IRGACURE 819 manufactured by BASF SE).

Among them, from the viewpoint of the reaction efficiency, a photopolymerization initiator is preferable.

The content of the polymerization initiator in the antibacterial composition is not particularly limited; however, the content of silver is preferably 0.1% to 15% by mass and more preferably 1% to 6% by mass, with respect to the total mass of the monomer.

The polymerization initiators may be used singly, or two or more kinds thereof may be used in combination. In a case where two or more kinds of polymerization initiators are used in combination, it is preferable that the total content is in the range described above.

(Dispersant)

The antibacterial composition may include a dispersant.

The dispersant is not particularly limited, and any known dispersant can be mentioned.

Examples of the dispersant include DISPERBYK-180 (a water-soluble, alkylolammonium salt, manufactured by BYK Additives & Instruments).

The content of the dispersant in the antibacterial composition is not particularly limited; however, generally, the content of the dispersant is preferably 0.01% to 5.0% by mass with respect to the total solid content of the antibacterial composition.

<Method for Producing Antibacterial Composition>

The antibacterial composition can be produced by mixing the various components described above. The order of mixing of the above-described components is not particularly limited; however, for example, an aspect of mixing the first monomer and the second monomer in a solvent to obtain a mixture, and mixing this mixture with other components may be also acceptable.

The viscosity of the antibacterial composition is not particularly limited; however, from the viewpoint of handleability, the viscosity is preferably 0.1 to 10,000 [mPa·s] and more preferably 1 to 1,000 [mPa·s].

<Use Applications of Antibacterial Composition>

The antibacterial composition can be used for the production of an antibacterial film and the production of an antibacterial film-attached substrate. The antibacterial composition may be used, for example, in an agent form such as a liquid agent, a gel agent, an aerosol spray agent, and a non-aerosol spray agent.

<Method for Producing Antibacterial Film>

An antibacterial film can be formed by using the above-described antibacterial composition. The method for producing the antibacterial film is not particularly limited; however, it is preferable to include the following Step 1 and Step 2.

<Step 1> a step of applying the antibacterial composition on the surface of a substrate and forming an antibacterial composition layer <Step 2> a step of curing the antibacterial composition layer and obtaining an antibacterial film (Step 1)

Step 1 is a step of applying the antibacterial composition on the surface of a substrate and forming an antibacterial composition layer.

The method for applying the antibacterial composition on the surface of a substrate is not particularly limited; however, any known method can be mentioned and examples thereof include a spraying method, a wire bar coating method, an extrusion coating method, a direct gravure coating method, a reverse gravure coating method, an inkjet method, and a die coating method.

The substrate that accomplishes the role of supporting an antibacterial film and the kind thereof is not particularly limited. In addition, the substrate may constitute a portion of various apparatuses (for example, a front surface plate).

The shape of the substrate is not particularly limited; however, examples thereof include a plate form, a film form, a sheet form, a tube form, a fiber form, and a particulate form. In addition, the form of the substrate surface on which an antibacterial film is disposed is not particularly limited; however, examples thereof include a flat surface, a concave surface, a convex surface, and combinations thereof.

The material that constitutes the substrate is not particularly limited; however, examples thereof include a resin, a metal, glass, and a ceramic. Among them, a resin is preferable from the viewpoint of handleability. In other words, a resin substrate is preferable.

The film thickness of the antibacterial composition layer is not particularly limited; however, the film thickness as a dried film thickness is preferably 0.1 to 30 μM, more preferably 2 to 20 μm, and still more preferably 3 to 10 μm. As the film thickness is larger, the scratch resistance of the film is better, and the silver-based antibacterial agent improves the surface roughness and provides an excellent appearance. In a case where the film thickness is adjusted to a value not exceeding a predetermined value not (for example, 30 μm), the curing shrinkage of the antibacterial composition layer during drying is further suppressed, and thus the occurrence of film cracking and the curling of the substrate is suppressed.

After the antibacterial composition is applied, the antibacterial composition layer may be subjected to a heating treatment in order to remove the solvent. The conditions for the heating treatment in such the case are not particularly limited; however, for example, the heating temperature is preferably 50° C. to 200° C., and the heating time is preferably 15 to 600 seconds. In a case where the heating temperature is 50° C. or higher, the aggregation of the silver-based antibacterial agent due to convection flow in the antibacterial composition layer is suppressed, and as a result, it is possible to suppress the occurrence of the roughness on the surface of the antibacterial film and to provide an antibacterial film having excellent appearance characteristics.

(Step B)

Step B is a step of curing the antibacterial composition layer and obtaining an antibacterial film.

The method of curing the antibacterial composition layer is not particularly limited; however, examples thereof include a light exposure treatment and a heating treatment.

The procedure of the light exposure treatment is not particularly limited; however, for example, an aspect of irradiating the antibacterial composition layer with ultraviolet light at a dose of 100 to 600 mJ/cm$^2$ using an ultraviolet lamp, and thereby curing the antibacterial composition layer, may be mentioned.

In the case of ultraviolet irradiation, ultraviolet light emitted from the light source of an ultrahigh-pressure mercury lamp, a high-pressure mercury lamp, a low-pressure mercury lamp, a carbon arc, a xenon arc, a metal halide lamp, or the like can be utilized.

The temperature for the heating treatment is not particularly limited; however, for example, the temperature is preferably 50° C. to 150° C., and more preferably 80° C. to 120° C.

According to the procedure described above, an antibacterial film-attached substrate having a substrate and an antibacterial film disposed on the substrate can be obtained.

The antibacterial film-attached substrate may be a laminate having a substrate and an antibacterial film disposed on the substrate and may have an aspect in which the antibacterial film is provided on both surfaces of the substrate.

The film thickness of the antibacterial film is not particularly limited; however, the film thickness thereof is preferably 2 to 20 μm, more preferably 3 to 15 μm, still more preferably 3 μm or more and less than 10 μm, and particularly preferably 3 to 8 μm, from the point of balancing scratch resistance and film cracking.

Examples

Hereinafter, the invention will be described in more detail based on Examples. The materials, amounts to be used, proportions, treatment details, treatment procedures, and the like described in the following Examples can be modified as appropriate as long as the gist of the invention is maintained. Therefore, the scope of the present invention should not be construed to be limited by Examples described below.

<Preparation of Antibacterial Composition>

The antibacterial composition was prepared by mixing each component according to the various components and the blending amounts shown in Table 1.

<Production of Antibacterial Film-Attached Substrate>

Antibacterial film-attached substrates were obtained by the following method using the antibacterial compositions.

The antibacterial composition was applied on the surface of a polyethylene terephthalate (PET) sheet (manufactured by FUJIFILM Corporation), which had been biaxially stretched to a thickness of 100 μm and in which an easily adhesive layer was laminated on the surface, so as to obtain an antibacterial film having the film thickness described in Table 1 and dried for 2 minutes at 60° C. Subsequently, the monomer was cured by irradiating the antibacterial composition with ultraviolet light, and thus antibacterial film-attached substrates were formed.

<Various Components>

The various components shown in Table 1 are indicated below.

Antibacterial agent 1: NOVARON AG300 (manufactured by Toagosei Co., Ltd.; zirconium phosphate on which silver has been carried and supported; having a silver content of 3% by mass based with respect to the total mass of the antibacterial agent 1; corresponding to the specific silver-based antibacterial agent)

Antibacterial agent 2: BACTERITE MP102SVC615 (manufactured by Fuji Chemical Industries Co., Ltd.; CaZn phosphate; having a silver content of 1% by mass with respect to the total mass of antibacterial agent 2; not corresponding to the specific silver-based antibacterial agent)

PETA: pentaerythritol triacrylate (manufactured by Nippon Kayaku Co., Ltd.; corresponding to the first monomer; having a molecular weight of 298)

DPHA: dipentaerythritol hexaacrylate (manufactured by Nippon Kayaku Co., Ltd.; corresponding to the second monomer; having a molecular weight of 578)

Miramer M4004: an ethoxylated pentaerythritol tetraacrylate (manufactured by Toyo Chemicals Co., Ltd.; corresponding to the first monomer; having a molecular weight of 572)

IPA: Isopropyl alcohol

PGMEA: Propylene glycol monomethyl ether acetate

184: IRGACURE 184 (manufactured by BASF SE)

<Various Evaluations>

(Antibacterial Property)

A test was carried out according to JIS-Z-2801: 2010, using *Escherichia coli* as a test bacterium and by bringing the obtained antibacterial film-attached substrate into contact with the bacterial solution for 24 hours. The antibacterial activity value after the test was measured, and evaluation was performed according to the following criteria.

(Evaluation criteria)

"A": The antibacterial activity value was 2 or more.

"B": The antibacterial activity value was less than 2.

(Liquid Discoloration)

After the obtained antibacterial composition was allowed to be left at 25° C. for 14 days, the antibacterial composition was visually observed and evaluated according to the following criteria. For practical use, "B" or more is preferable.

"A": No discoloration

"B": Slightly yellow discoloration

"C": Yellowish brown discoloration

"D": Black discoloration (Film Discoloration)

After allowing the obtained antibacterial composition to be left at 25° C. for 24 hours, an antibacterial film-attached substrate was produced according to the same procedure as the above-described <Production of antibacterial film-attached substrate> using the antibacterial composition after being left. Then, after allowing the antibacterial film-attached substrate to be left at 25° C. for 365 days, the antibacterial film in the antibacterial film-attached substrate was visually observed and evaluated according to the following criteria. For practical use, "B" or more is preferable.

"A": No discoloration

"B": Slightly gray discoloration

"C": Gray discoloration (Film Cracking)

An antibacterial film-attached substrate was produced according to the same procedure as the above-described <Production of antibacterial film-attached substrate>. Then, the antibacterial film in the antibacterial film-attached substrate was visually observed and evaluated according to the following criteria.

"A": No film cracking observed
"B": Film cracking observed

It is noted that the silver content in each antibacterial composition was 0.015% by mass with respect to the total mass of the antibacterial composition.

In Table 1, "Content (% by mass)" indicates the content (% by mass) of each component with respect to the total mass of the antibacterial composition.

"Content of first monomer/Total amount of monomers (% by mass)" indicates the content proportion (% by mass) of the first monomer with respect to the total mass of the monomer.

TABLE 1

| | Antibacterial composition | | | | | | | |
|---|---|---|---|---|---|---|---|---|
| | Antibacterial agent | | First monomer | | Second monomer | | Content of first monomer/total amount of monomers (% by mass) | Polymerization initiator |
| | Kind | Content (% by mass) | Kind | Content (% by mass) | Kind | Content (% by mass) | | Kind |
| Example 1 | Antibacterial agent 1 | 0.5 | PETA | 32.5 | DPHA | 13.9 | 70 | 184 |
| Example 2 | Antibacterial agent 1 | 0.5 | PETA | 27.8 | DPHA | 18.5 | 60 | 184 |
| Example 3 | Antibacterial agent 1 | 0.5 | PETA | 23.2 | DPHA | 23.2 | 50 | 184 |
| Example 4 | Antibacterial agent 1 | 0.5 | PETA | 18.5 | DPHA | 27.8 | 40 | 184 |
| Example 5 | Antibacterial agent 1 | 0.5 | PETA | 13.9 | DPHA | 32.5 | 30 | 184 |
| Example 6 | Antibacterial agent 1 | 0.5 | PETA | 27.8 | DPHA | 18.5 | 60 | 184 |
| Example 7 | Antibacterial agent 1 | 0.5 | PETA | 27.8 | DPHA | 18.5 | 60 | 184 |
| Comparative Example 1 | Antibacterial agent 2 | 0.5 | Miramer M4004 | 32.5 | DPHA | 13.9 | 70 | 184 |
| Comparative Example 2 | Antibacterial agent 1 | 0.5 | PETA | 37.1 | DPHA | 9.3 | 80 | 184 |
| Comparative Example 3 | Antibacterial agent 1 | 0.5 | PETA | 9.3 | DPHA | 37.1 | 20 | 184 |

| | Antibacterial composition | | | Antibacterial film | Evaluation | | | |
|---|---|---|---|---|---|---|---|---|
| | Polymerization initiator | Solvent | | Film | | | | |
| | Content (% by mass) | Kind | Content (% by mass) | thickness (μm) | Antibacterial property | Liquid discoloration | Film discoloration | Film cracking |
| Example 1 | 1.0 | IPA/PGMEA (60/40) | 52.1 | 5 | A | B | A | A |
| Example 2 | 1.0 | IPA/PGMEA (60/40) | 52.1 | 5 | A | A | A | A |
| Example 3 | 1.0 | IPA/PGMEA (60/40) | 52.1 | 5 | A | A | A | A |
| Example 4 | 1.0 | IPA/PGMEA (60/40) | 52.1 | 5 | A | A | A | A |
| Example 5 | 1.0 | IPA/PGMEA (60/40) | 52.1 | 5 | A | A | A | A |

TABLE 1-continued

| | | | | | | | | |
|---|---|---|---|---|---|---|---|---|
| Example 6 | 1.0 | IPA/PGMEA (60/40) | 52.1 | 6 | A | A | A | A |
| Example 7 | 1.0 | IPA/PGMEA (60/40) | 52.1 | 8 | A | A | A | A |
| Comparative Example 1 | 1.0 | IPA/PGMEA (60/40) | 52.1 | 5 | A | C | C | A |
| Comparative Example 2 | 1.0 | IPA/PGMEA (60/40) | 52.1 | 5 | A | D | C | A |
| Comparative Example 3 | 1.0 | IPA/PGMEA (60/40) | 52.1 | 5 | A | A | A | B |

As shown in Table 1, the antibacterial composition of the present invention exhibited desired effects.

From the comparison with Examples 1 to 5, it has been confirmed that in a case where the content of the first monomer is 30% to 60% by mass with respect to the total mass of the monomer having a polymerizable group, the desired effects are more excellent.

What is claimed is:

1. An antibacterial composition comprising:
   a silver-based antibacterial agent containing zirconium phosphate and silver carried and supported on the zirconium phosphate;
   at least one monomer having at least one polymerizable group; and
   a solvent,
   wherein the monomer having the at least one polymerizable group includes a first monomer having the at least one polymerizable group and a hydrophilic group, and a second monomer having the at least one polymerizable group and having no hydrophilic group, and
   a content of the first monomer is 30% to 60% by mass with respect to a total mass of the monomer having the at least one polymerizable group,
   wherein the first monomer is pentaerythritol triacrylate or ethoxylated glycerin triacrylate; and
   the second monomer is an acrylate monomer having two or more polymerizable groups and having no hydrophilic group, or a methacrylate monomer having two or more polymerizable groups and having no hydrophilic group.

2. The antibacterial composition according to claim 1, wherein a molecular weight of the first monomer is lower than a molecular weight of the second monomer.

3. The antibacterial composition according to claim 1, wherein the solvent contains an alcohol, and
   a content of the alcohol is 40% by mass or more and less than 100% by mass with respect to a total mass of the solvent.

4. An antibacterial film formed by using the antibacterial composition according to claim 1.

5. The antibacterial film according to claim 4, wherein the antibacterial film has a thickness of 2 to 20 μm.

6. An antibacterial film-attached substrate comprising:
   a substrate; and
   the antibacterial film according to claim 4, disposed on the substrate.

7. The antibacterial composition according to claim 1, wherein a molecular weight of the first monomer is lower than a molecular weight of the second monomer.

8. The antibacterial composition according to claim 1, wherein the solvent contains an alcohol, and
   a content of the alcohol is 40% by mass or more and less than 100% by mass with respect to a total mass of the solvent.

9. An antibacterial film formed by using the antibacterial composition according to claim 1.

10. The antibacterial film according to claim 9, wherein the antibacterial film has a thickness of 2 to 20 μm.

11. An antibacterial film-attached substrate comprising:
    a substrate; and
    the antibacterial film according to claim 5, disposed on the substrate.

12. An antibacterial film-attached substrate comprising:
    a substrate; and
    the antibacterial film according to claim 9, disposed on the substrate.

13. The antibacterial composition according to claim 2, wherein the solvent contains an alcohol, and
    a content of the alcohol is 40% by mass or more and less than 100% by mass with respect to a total mass of the solvent.

14. An antibacterial film formed by using the antibacterial composition according to claim 2.

15. The antibacterial film according to claim 14, wherein the antibacterial film has a thickness of 2 to 20 μm.

16. An antibacterial film-attached substrate comprising:
    a substrate; and
    the antibacterial film according to claim 14, disposed on the substrate.

17. The antibacterial composition according to claim 1, wherein the second monomer is selected from the group consisting of trimethylolpropane triacrylate, tetramethylolmethane tetraacrylate, dipentaerythritol hexaacrylate, and pentaerythritol tetraacrylate.

18. The antibacterial composition according to claim 1, wherein the second monomer is represented Formula (2):

in Formula (2), Y represents a polymerizable group, $L^2$ independently represents an alkylene group, Z represents a carbon atom or a group represented by Formula (A),

R represents a hydrogen atom or an alkyl group,
in a case where Z is a carbon atom, q represents an integer of 1 to 4, p represents an integer of 0 to 3, and q and p satisfy a relationship of q+p=4; in a case where Z is a group represented by Formula (A), q represents an integer of 1 to 6, p represents an integer of 0 to 5, and q and p satisfy a relationship of q+p=6.

19. The antibacterial composition according to claim 1, wherein the second monomer comprises trimethylolpropane triacrylate, tetramethylolmethane tetraacrylate, dipentaerythritol hexaacrylate, or pentaerythritol tetraacrylate.

20. The antibacterial composition according to claim 1, wherein the first monomer is a pentaerythritol triacrylate, and the second monomer is selected from the group consisting of trimethylolpropane triacrylate, tetramethylolmethane tetraacrylate, dipentaerythritol hexaacrylate, and pentaerythritol tetraacrylate, and
    a content of the first monomer with respect to the total mass of the antibacterial composition is 10% to 30% by mass, a content of the second monomer with respect to the total mass of the antibacterial composition is 10% to 30% by mass.

21. The antibacterial composition according to claim 1, wherein the solvent contains isopropanol, and
    a content of the isopropanol is 40% by mass or more and less than 100% by mass with respect to a total mass of the solvent.

* * * * *